United States Patent [19]

Umesaki

[11] Patent Number: 5,119,354
[45] Date of Patent: Jun. 2, 1992

[54] DISK REPRODUCING APPARATUS

[75] Inventor: Kiyosi Umesaki, Neyagawa, Japan

[73] Assignee: Matsushita Electric Industrial Co., Ltd., Osaka, Japan

[21] Appl. No.: 504,138

[22] Filed: Apr. 3, 1990

[30] Foreign Application Priority Data

Apr. 6, 1989 [JP] Japan .................................. 1-87621

[51] Int. Cl.⁵ .................. G11B 17/22; G11B 3/58; G11B 17/04; G11B 17/08
[52] U.S. Cl. ................................ 369/36; 369/77.1; 369/178; 369/191; 369/196; 369/233
[58] Field of Search ............... 369/36, 75.2, 77.1, 369/178, 191, 196, 233, 247

[56] References Cited

U.S. PATENT DOCUMENTS

| | | | |
|---|---|---|---|
| 4,098,510 | 7/1978 | Suzuki et al. | 369/75.2 |
| 4,589,101 | 5/1986 | Schatteman et al. | 369/38 |
| 4,592,039 | 5/1986 | Toyoguchi | 369/75.2 |
| 4,730,292 | 4/1988 | Hasegawa | 369/36 |
| 4,797,865 | 1/1989 | Imai et al. | 369/39 |
| 4,811,324 | 3/1989 | Ikedo | 369/75.2 |
| 4,969,140 | 11/1990 | Koiwa | 369/75.2 |

FOREIGN PATENT DOCUMENTS

| | | | |
|---|---|---|---|
| 0502020 | 4/1943 | Canada | 369/36 |
| 0177232 | 4/1986 | European Pat. Off. | 369/77.1 |
| 0296829 | 12/1988 | European Pat. Off. | |
| 0166559 | 10/1983 | Japan | 369/77.1 |
| 2160349 | 12/1985 | United Kingdom | |

Primary Examiner—Stuart S. Levy
Assistant Examiner—Christopher R. Glembocki
Attorney, Agent, or Firm—Wenderoth, Lind & Ponack

[57] ABSTRACT

A disk playing apparatus is capable of playing a plurality of disks or disks of different diameters. A disk transfer mechanism is provided between a magazine for storing the plurality of disks and a disk musical performance mechanism disposed obliquely and rearwards with respect to the mounting position of the magazine. Also, a single disk insertion opening is provided above or below the mounting position of the magazine. A disk inserted into the disk insertion opening is also transferred by the disk transfer mechanism.

16 Claims, 8 Drawing Sheets

DISK REPRODUCING APPARATUS

BACKGROUND OF THE INVENTION

The present invention generally relates to a disk playing apparatus which makes it possible to play a plurality of optical disks called compact disks, and/or disks of different diameters.

For example, an ordinary disk (hereinafter referred to as a CD) of 12 cm in size, and the small-diameter disk (hereinafter referred to as a CD single) of 8 cm in size, are generally used as compact disks. In recent years, the use of CD players has spread considerably. CD players of not only a stationary type, but also a portable type and a car-loading type have been extensively marketed. In addition to the disks of 12 cm, the CD singles of 8 cm have appeared, and are expected to increase remarkably in popularity in the future. At the beginning, CD players adopted a method of playing the CDs with adapters being provided for CD singles. But direct play thereof is gradually increasing, without the adapters, in terms of improvements in operability, with this tendency increasing especially in car-loading CD players. Also, a change type of player has increased in popularity because of its superior operability and because the disks are drawn one by one from an exclusive magazine, which has many disks therein to be played.

Especially in the CD players for car-loading use, the CD single measure without the adapters is behind, because the disk engagement method of a front loading system is used more due to the use thereof within the car. Measures to cope with this problem are desired. Also, even in the change type of CD players, the measures the CD singles have to take are behind, with problems that a setting location is restricted in terms of the size of the main body.

SUMMARY OF THE INVENTION

Accordingly, the present invention has been developed with a view to substantially eliminating the above discussed drawbacks inherent in the prior art disk playing apparatus, and has the essential object of providing an improved change type of disc playing apparatus, taking advantage of the merits of the prior art disc playing apparatus.

Another object of the present invention is to provide a change type of disk playing apparatus which is capable of using both CDs and CD singles in a front loading system.

Still another object of the present invention is to provide a change type of disk playing apparatus which is reduced in size by the use of a magazine for CD singles.

In accomplishing these and other objects, according to one preferred embodiment of the present invention, the disk playing apparatus is characterized in that the disk musical performance position is constructed obliquely and rearwardly with respect to a magazine storing position for CD singles.

Also, the disk playing apparatus of the present invention is characterized in that in the above described construction, an insertion opening for loading a CD is provided above or below the magazine storing position.

Also, the disk reproducing apparatus of the present invention is characterized in that in the above described construction, a disk feed roller is provided which is adapted to effect a vertical disk movement operation from the magazine, and to effect a pivoting movement around a shaft provided on a stationary base plate upon disk movement from the direct insertion opening.

The present invention has an advantage in that in the accommodation of a magazine of CD singles into the space restricted space of a DIN size of car-loading use, the musical performance position is arranged obliquely and rearwardly with respect to the accommodation position, so that the space may be effectively used and the function of the auto-changer operation may be used.

Also, the present invention has an advantage in that a change function by the magazine and a direct insertion opening for a CD or a CD single are provided, so that only one loading of an ordinary disk may be effected, and continuous play by the magazine and play from the direct insertion of a disk without the use of the magazine may both be effected.

For both the change operation and the direct insertion with the vertical movement and the pivoting operation one set of rollers is used, with an advantage in that the number of components may be reduced and space may be saved, as compared with cases where separate exclusive rollers are respectively arranged.

BRIEF DESCRIPTION OF THE DRAWINGS

These and other objects and features of the present invention will become apparent from the following description taken in conjunction with the preferred embodiment thereof with reference to the accompanying drawings, in which:

FIG. 12 is a plan view showing a drawing operation and the horizontal movement of a disk from the magazine;

FIG. 13 is a side view showing the horizontal movement during and after a descending operation of the disk; and FIG. 14 is a plan view showing the positions of the CD and the CD single, and the magazine in the disk engagement position.

DETAILED DESCRIPTION OF THE INVENTION

Figure 1:
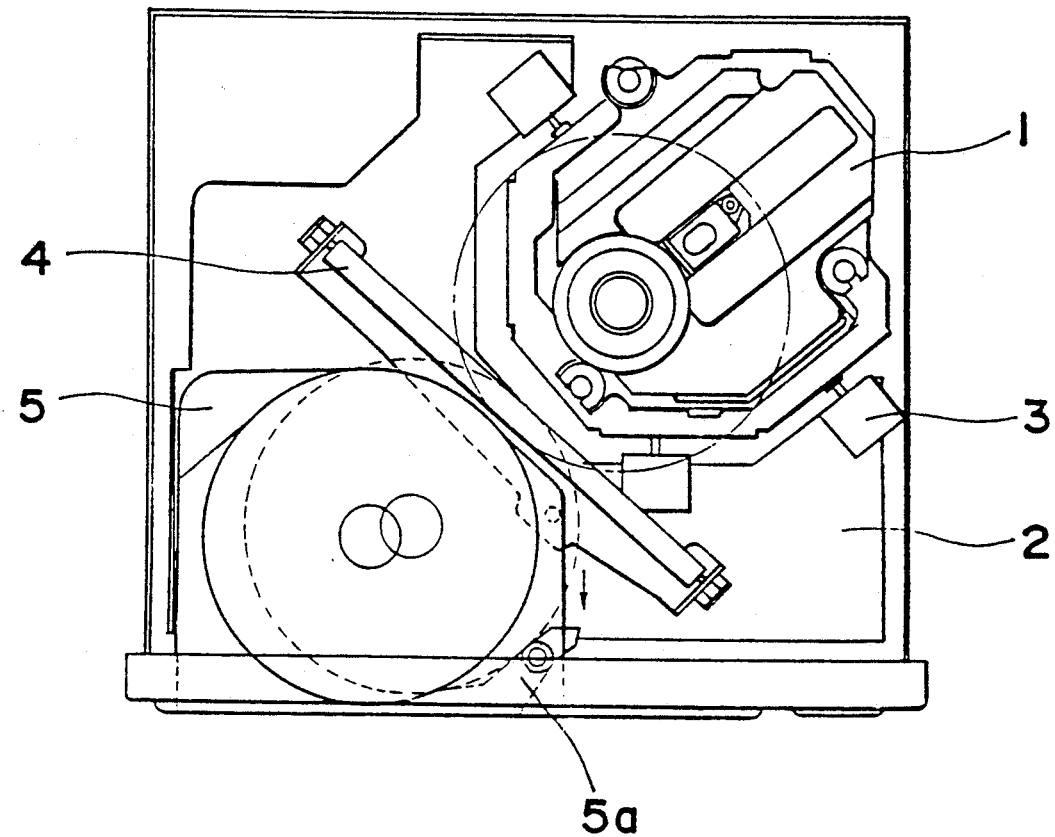
FIG. 1 is a plan view showing the relationship between a magazine of the CD player of the present invention and a disk musical performance position thereof.

Before the description of the present invention proceeds, it is to be noted that like parts are designated by like reference numerals throughout the accompanying drawings.

Figure 2:
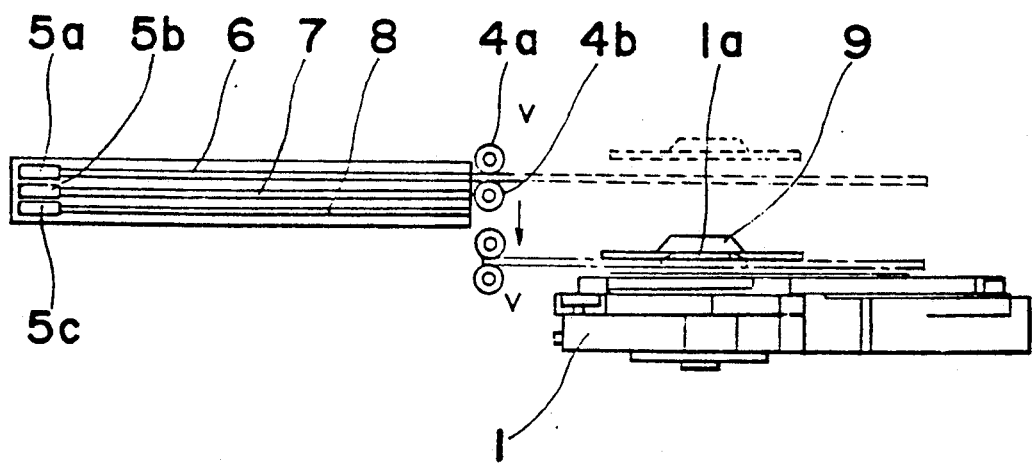
FIG. 2 is a side view thereof.

Referring now to the drawings, there is shown in FIGS. 1 and 2 the relationship between a magazine of a CD player and a disk musical performance position according to one preferred embodiment of the present invention. FIG. 1 shows a condition of a 1DIN size CD player seen from above. FIG. 2 is a side view thereof. The CD player, as the disk playing apparatus of the present invention, includes a traverse mechanism 1, which effects ordinary traverse operations such as disk rotation, optical pick up movement, and so on, so as to read the signals of the disk faces, and a mechanism base plate 2 with various mechanism components mounted on it. A damper rubber 3 is fixed on the base plate 2, is engaged with the traverse mechanism 1, and is provided with a buffer function so that impacts and oscillations may not be transmitted to the traverse mechanism. A roller arm or retaining member is disposed for vertical operations on the base plate 2, and causes the disk to move by a roller rotating operation with a pressure grip of a pair of rollers 4a and 4b, and has a guide member built-in in the roller arm 4 so that the disk won't be shaken vertically when the disk is grasped between the rollers and overhangs during the horizontal movement of the disk. A magazine 5 with three CD singles stored therein has disk take-out levers 5a, 5b and 5c arranged corresponding to each disk of the three CD singles so as to have a function of causing the disk to be engaged between the rollers by a pushing operation in the arrow mark direction. The traverse mechanism 1 and the magazine 5 are composed diagonally in the 1DIN size, and the roller arm 4 is obliquely arranged between the traverse mechanism and the magazine. Referring to FIG. 2, reference numeral 6 is a first disk stored in the upper stage of the magazine 5, reference numeral 7 is a second disk stored in the intermediate stage thereof, and reference numeral 8 is a third disk which is stored in the lower stage. Reference numeral 9 is a clamp which relates to a centering ring 1a of the traverse mechanism 1 by being attracted thereby and a magnet so as to effect a disk clamping operation when the disk is engaged. By the pushing operation of the disk take-out lever 5a of the magazine 5, the disk 6 is projected out of the magazine 5 so that the disk is grasped between the passive roller 4a and the driving roller 4b. The disk 6 effects a horizontal movement onto the right hand side by the clockwise rotation of the driving roller 4b. The rotation of the driving roller 4b is stopped in a position where the disk has been drawn completely out of the magazine 5. The roller arm 4 is then caused to effect a downward movement with the disk 6 grasped between the rollers. The disk 6 is caused to come to a stop in a position where it may be engaged with the centering ring 1a. Thereafter, the passive roller 4a moves upwardly and the driving roller 4b moves downwardly, so so to release the CD single so that the CD single can be played. In this case, the clamp 9 is in a position above the disk drawn out from the magazine 5, and descends according to the downward movement of the disk, or after the movement. Also, after the disk has been clamped onto the traverse mechanism 1 by the clamper 9, the rollers 4a and 4b move in the separating direction as noted above, to allow the disk to be rotated. The construction as described hereinabove allows the magazine 5 to be completely accommodated in the panel within the space of the 1DIN, and simplifies the operation necessary for the drawing out of the disk.

Figure 3:
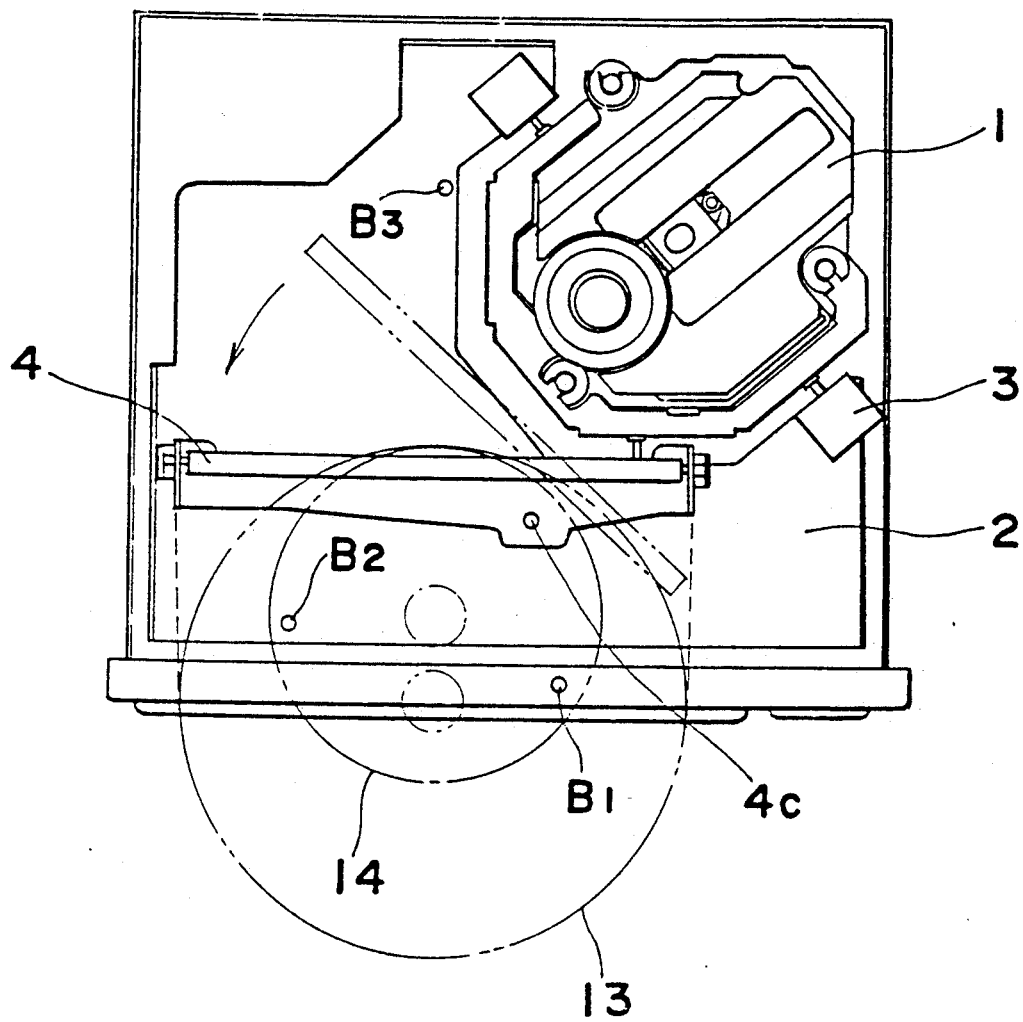
FIG. 3 is a plan view of a CD player where a magazine and a direct insertion opening are provided.
Figure 4:
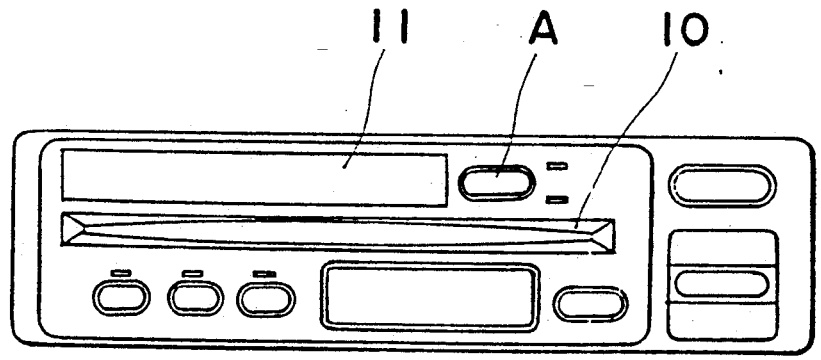
FIG. 4 is a front face view showing a front panel of the CD player of FIG. 3.

FIG. 3 is a plan view showing a case where a direct insertion may be effected by a front loading operation in the construction described in FIG. 1 and FIG. 2. FIG. 4 shows a front panel in this case. Referring to FIG. 3, the roller arm 4 is in a lateral condition due to rotation in a counter-clockwise direction around a pivoting shaft 4c from the condition of FIG. 1. The roller arm 4 has been lowered down to a position where it is not in contact with the magazine 5, even in the vertical direction. Referring to FIG. 4, there is a direct insertion opening 10 provided in a location corresponding to the above described position of the roller arm 4, and a magazine storing opening 11 constructed above the direct insertion opening. Also, a button A in FIG. 4 is provided to select a disk. The button switches between playing the disk inserted from the direct insertion opening 10 or playing a disk provided within the magazine 5 of the magazine storing opening 11. Every time the button A is depressed, the condition is alternately switched. For example, the change from FIG. 1 condition of the roller arm 4 to FIG. 3 condition is also effected by the depressing operation of the button A. When the button A is depressed in the condition of the roller arm 4 of FIG. 1, the condition of the roller arm 4 is provided as shown in a solid line of FIG. 3. When the button A is depressed again, the original condition of FIG. 1 is provided by the reverse operation. In case a disk 13 or 14 has been inserted into the direct insertion opening 10 in the condition of FIG. 3, the insertion disk 13 or 14 is detected by a photo-sensor B1 or B2 provided near the insertion opening 10, the rotation of the pair of rollers 4a and 4b of the roller arm 4 starts, and the disk horizontally moves as far as the constant position by a method to be described later. Also, the roller arm 4 is rotated in the clockwise direction by a switch (not shown) for detecting the insertion of the magazine 5 into the magazine storing opening 11 (or by the depression of the above described button A) from the condition of FIG. 3, and returns to the first condition again, so that disk engagement from the magazine 5 may be effected. In the construction described above, by the vertical movement and the pivoting operation of the roller arm 4, the arm 4 may be used for disk engagement both from the magazine 5 and from the direct insertion opening 10. The number of parts may thus be reduced and space saved. Two methods of effecting musical performance may be properly used, the CD single may be inserted from the direct insertion opening 10 and stored in the magazine 5, and the reverse operation thereof may be effected.

Figure 5:
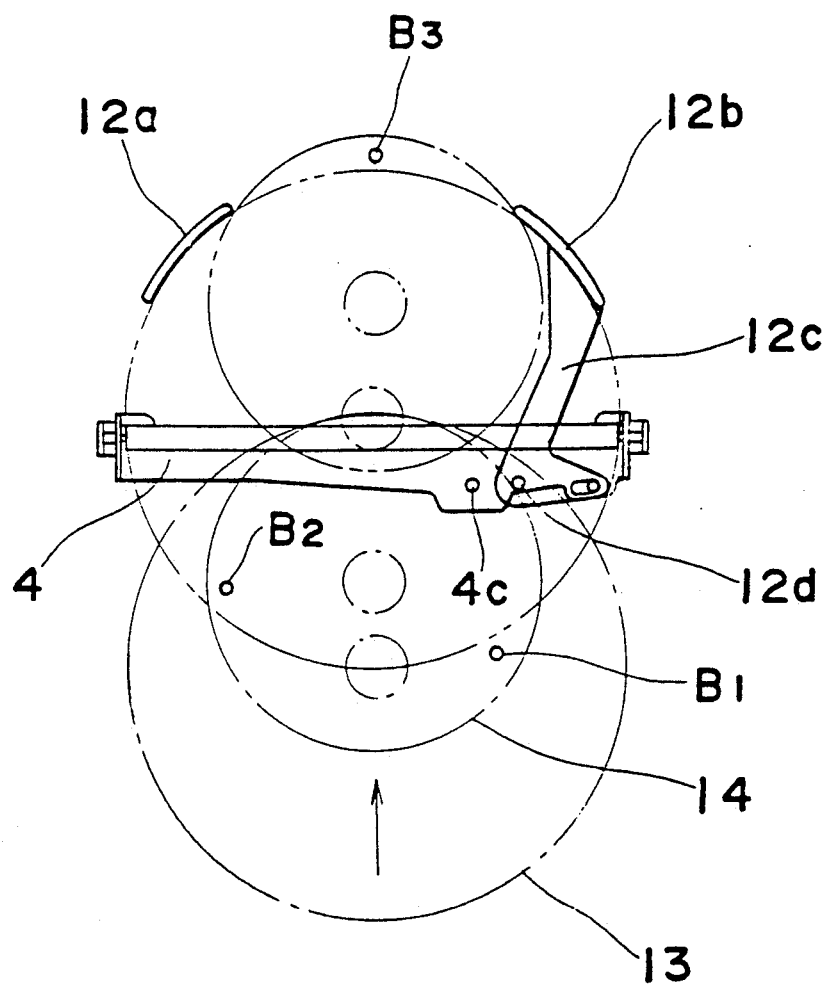
FIG. 5 is a schematic view showing a method of discriminating between the CD and the CD single.

FIG. 5 shows a method of discriminating between the CD and the CD single. Reference characters 12a and 12b are 8 cm-12 cm detection guides, and operatively cooperate with the roller arm 4 so as to stop the advance of the inserted disk with the roller arm 4 being lateral. Also, the detection guide 12b is adapted to externally escape or move aside as shown in broken lines in FIGS. 6 and 7, to be described later, with a shaft 12d of the base portion of an arm 12c being a center when the roller arm 4 pivots in the clockwise direction as shown in FIG. 1 so as not to come into contact against the disk. Also, the 8 cm-12 cm detection guides 12a and 12b are disposed one by one, right and left, in such a manner as to come into contact with the external periphery of the CD 13. When the CD 13 has been inserted in the above described construction, the CD 13 is moved in an arrow mark direction, and thereafter is stopped by the 8-12 detection guides 12a and 12b. Also, when the CD single 14 has been inserted, the CD 14 is likewise moved in the arrow mark direction, and thereafter is stopped in a position with the CD single being grasped between the 8-12 detection guides 12a and 12b. When the CD single 14 has been inserted in a position shifted right or left, the CD single 14 finally stops in the same position, receiving a directional correction by the 8-12 detection guides 12a and 12b. The roller of the roller arm 4 which is used in this case is narrower in the diameter at the central portion thereof as compared with both ends thereof, and the grasped CD single is thus likely to move towards the center. Accordingly, as each disk stops at a constant position, a portion where only either of the CD 13 and the CD single 14 exists is provided. Three photosensors B1, B2 and B3 are disposed in the positions shown, so that a discriminating operation may be effected, and whether the disk inserted from the insertion opening is a CD or a CD single is determined. Namely, when the photo-sensor B3 at the tip end has detected a disk, it is determined that the CD single 14 has been inserted into its final position, with only the sensor B3 detecting a disk. When only the sensor B2 detects a disk and the sensors B1 and B3 do not detect a disk, it is determined that the CD 13 has been inserted into its final position.

Figure 6:
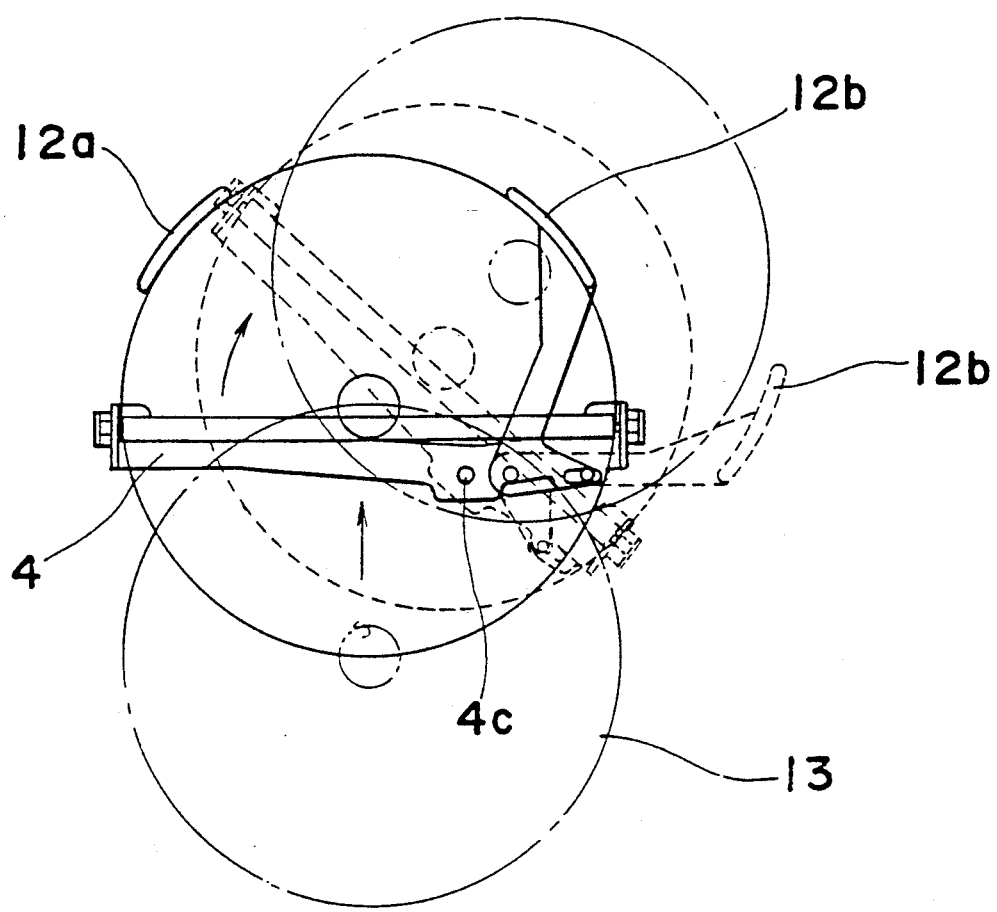
FIG. 6 is a illustrative view showing an engagement operation of a CD after a discrimination thereof has been effected.

FIG. 6 shows the operation in the case of a CD after the discrimination operation of FIG. 5. The roller arm 4 effects its pivoting operation in the clockwise direction with the pivoting shaft 4c being provided as a center, and with the CD 13 remaining grasped between the rollers 4a and 4b of the roller arm 4 and moves to the position shown in broken lines. By the pivoting operation, the guide 12b from the 8-12 detection guides 12a and 12b moves so as to not come into contact with the disk in the position after the pivoting operation. By the rotation of the rollers 4a and 4b of the roller arm 4, the horizontal movement of the disk is again effected. The rotation is stopped when the musical performance position is reached, and the clamp 9 is lowered relative to the traverse mechanism 1 so that the CD 13 is grasped by the centering ring 1a and the clamp 9 in an engagement condition.

Figure 7:
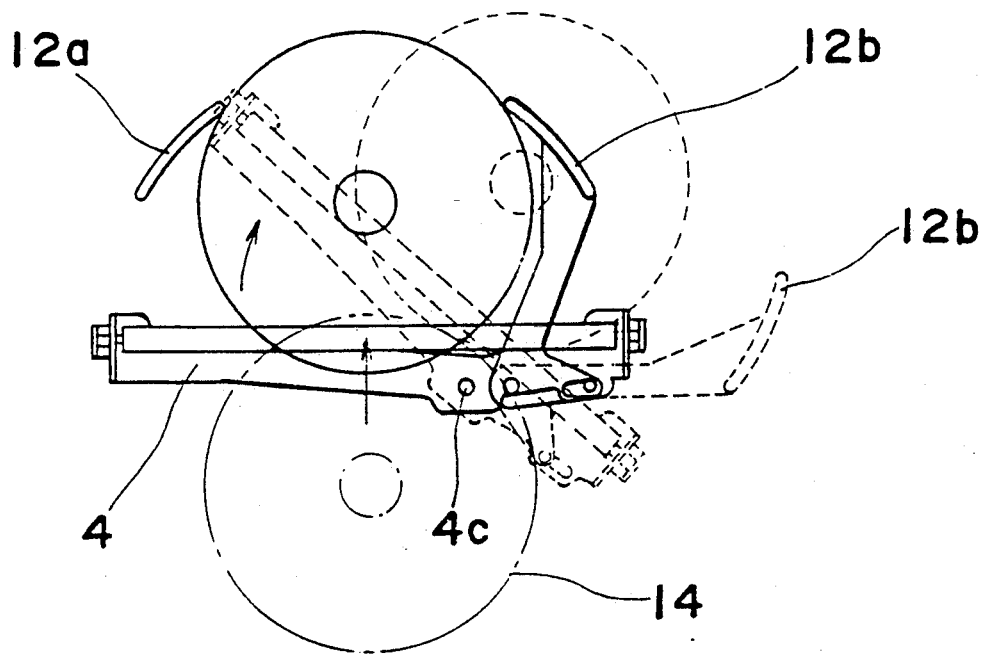
FIG. 7 is an illustrative view showing an engagement operation of a CD single after a discrimination has been effected.

FIG. 7 shows the operation in the case of a CD single after the discriminating operation of FIG. 5. The roller arm 4 pivots in the clockwise direction into the condition shown in broken lines with the pivoting shaft 4C as a center, and the CD single 14 remaining grasped by the rollers 4a and 4b of the roller arm 4. By the pivoting operation, the guide 12b of the 8-12 detection guides 12a and 12b moves so as not to come into contact with the disk in the position after the pivoting operation. At this time, the original positions of the 8-12 detection guides 12a and 12b are set with respect to the traverse mechanism 1 so that the position of the CD single 14 after the pivoting operation thereof may become an engagement position. Thus by lowering the clamp 9 relative to the traverse mechanism 1 after the pivoting operation of the roller arm 4, the CD single 13 may be grasped by the centering ring 1a and the clamp 9 into the engagement condition. By the construction described above, the discriminating operation between a CD and a CD single may be effected, and the engagement operation may be effected in accordance with either of the respective disks.

Figure 8:
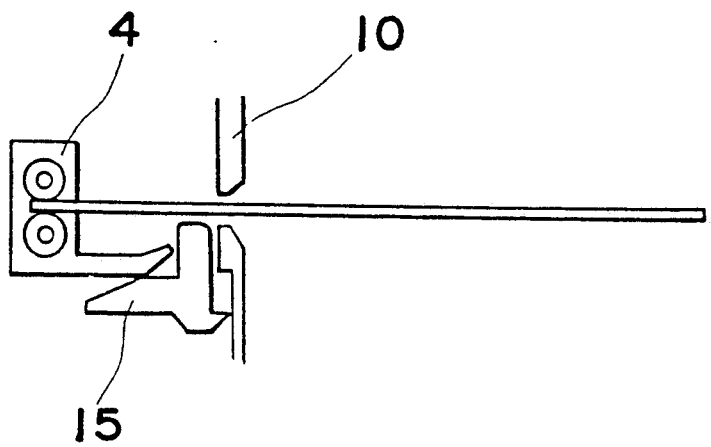
FIG. 8 and FIG. 9 are side views, showing a method of preventing the double insertion of a disk during the operation of the CD player.
Figure 9:
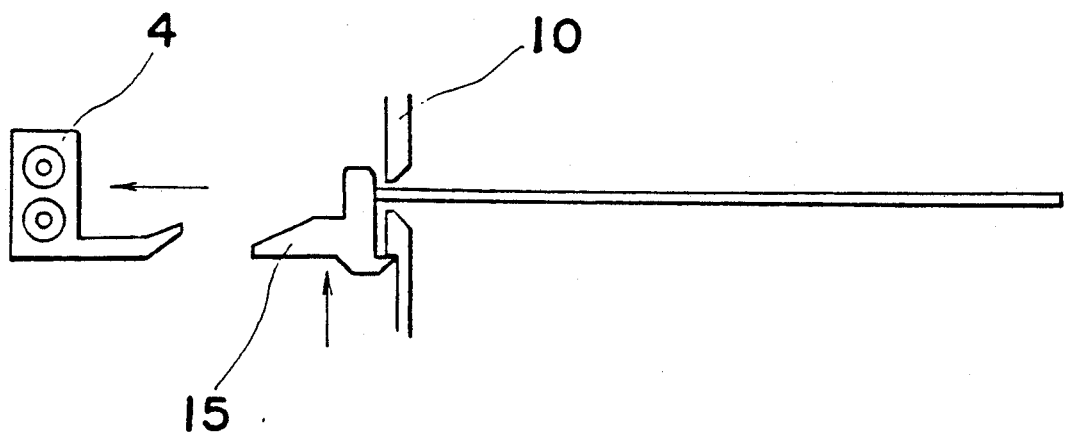

FIG. 8 and FIG. 9 show a construction for preventing the double insertion of a disk during the musical performance or playing of a CD. FIG. 8 shows a condition where the disk may be inserted. FIG. 9 shows a condition where the disk is prevented from being inserted. In FIG. 8, the reference numeral 15 is a prevention lever, which is mounted for its vertical motion on the mechanism base plate 2, and is subject to a spring urging force in the upward direction or is regulated in operation in the lateral direction. When the roller arm 4 is located in a position corresponding to the insertion opening as shown in FIG. 3, the prevention lever 15 is in an engagement relation with respect to the roller arm 4, and is held in a lowered position with respect to the spring urging force. Therefore, when the disk 13 or 14 is inserted from the direct insertion opening 10, it may reach between the rollers 4a and 4b of the roller arms 4. In FIG. 9, when the roller arm 4 is in such a position as shown in FIG. 1, the roller arm 4 is released from engagement with the prevention lever 15, and the prevention lever 15 is then raised upwardly by the spring urging force. At this time, the prevention lever 15 closes the disk passing range of the direct insertion opening 10. Accordingly, the prevention lever 15 prevents a loading from being effected if a disk is tried to be inserted. In the construction described above, when a CD or CD single is being played, or during a change operation, a roller arm 4 is in the condition of FIG. 1. The condition where the direct insertion may be effected is provided only in FIG. 3, so that the prevention of insertion of a CD or CD single is otherwise provided. Therefore, the simple construction as described hereinabove may prevent a double insertion during a musical performance or a change operation.

Figure 10:
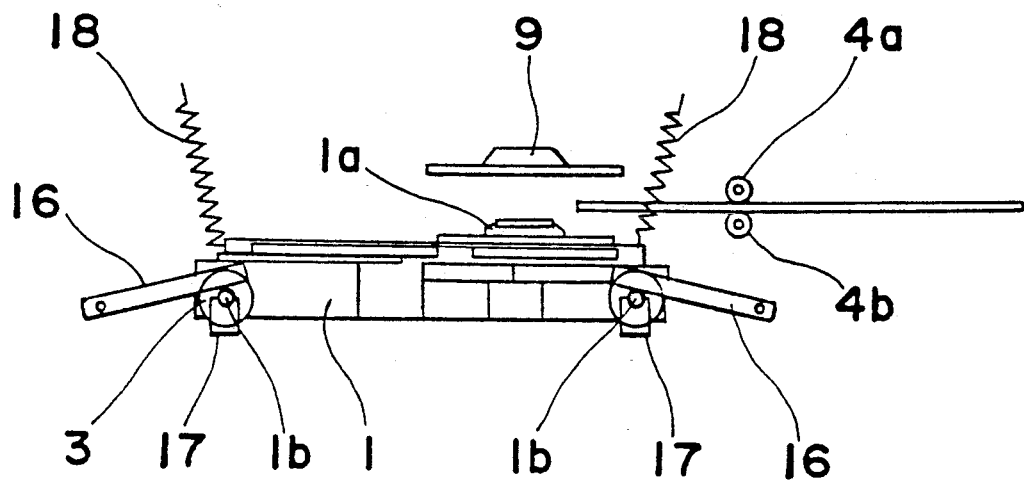
FIG. 10 and FIG. 11 are side views showing a method of effecting a disk loading operation.
Figure 11:
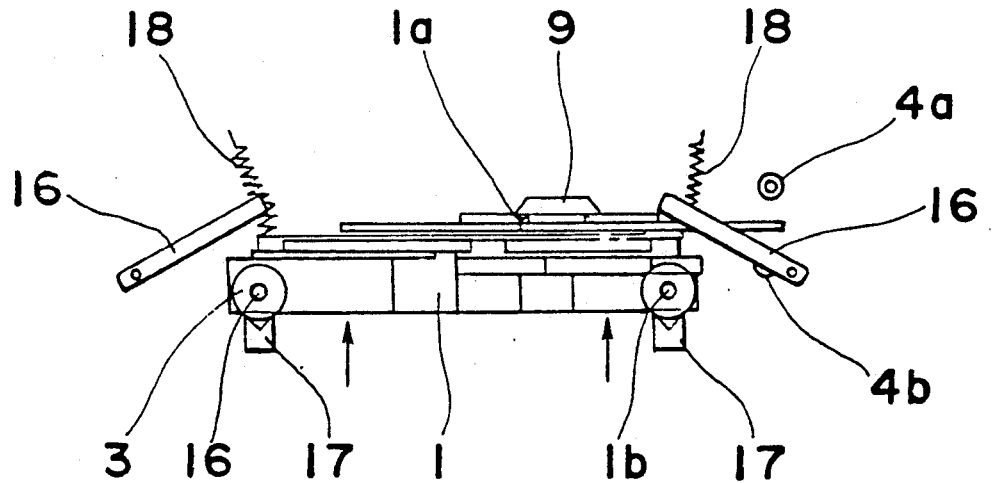

FIG. 10 and FIG. 11 show a method of effecting the disk loading operation by the difference between a traverse mechanism fixing and a floating condition. FIG. 10 shows the fixing condition of the traverse mechanism. FIG. 11 shows the floating condition of the traverse mechanism. In FIG. 10, reference numeral 16 is a stationary lever, which is disposed for pivoting operation on the mechanism base plate 2 so that the traverse mechanism 1 may be downwardly depressed. Reference numeral 17 is a stationary guide, which is mounted on the mechanism base plate 2 so as to secure the traverse mechanism 1, with a stationary pin 1b of the traverse mechanism 1 being grasped between a V shaped groove portion and the stationary levers 16. Reference numeral 18 is a spring, with the traverse mechanism 1 being suspended therefrom. Since the traverse mechanism 1 is downwardly depressed in the condition of FIG. 10, it is possible to move the disk horizontally so as to arrange it on the centering ring 1a of the traverse mechanism 1. Then, the stationary level 16 is upwardly pivoted as shown in FIG. 11 so as to release the stationary pin 1b of the traverse mechanism 1, so that the traverse mechanism 1 is upward moved by the springs 18 into the floating condition and is stable in a position balanced by the springs 18. After the traverse mechanism 1 has been raised, the disk is put into the engagement condition by the centering ring 1a and the clamp 9. by the construction as described above, the movement of the disk allows the engagement operation only in the horizontal direction, and further, the space which is provided with the degree of freedom necessary for the floating operation may be effectively used.

Figure 12:
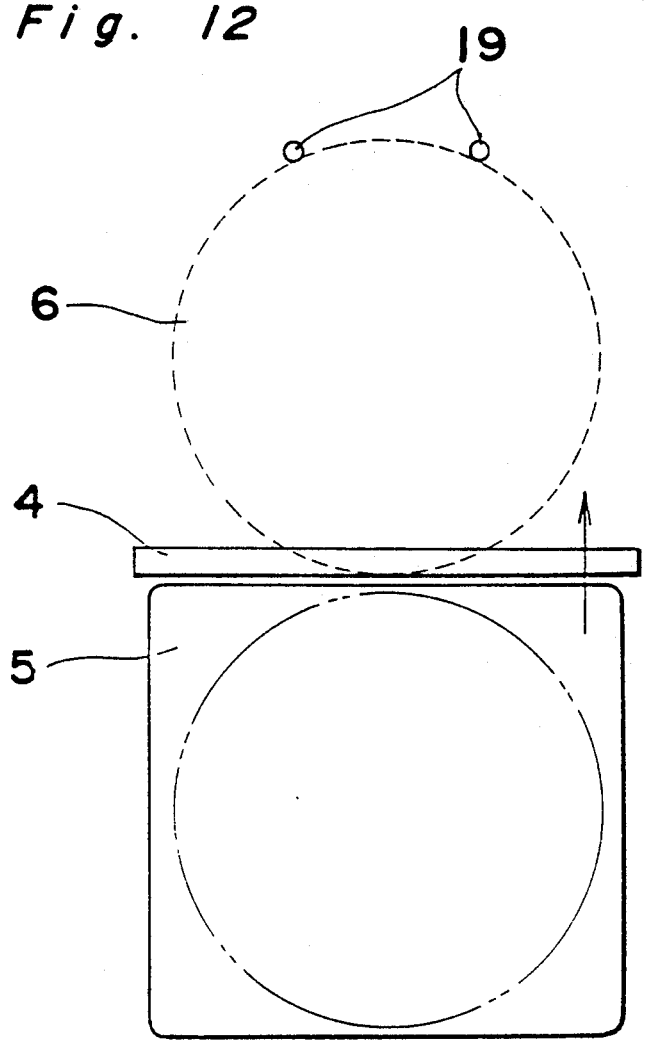
FIGS. 12 through 14 show an example of a space saving operation of the disk engagement from the magazine.
Figure 13:
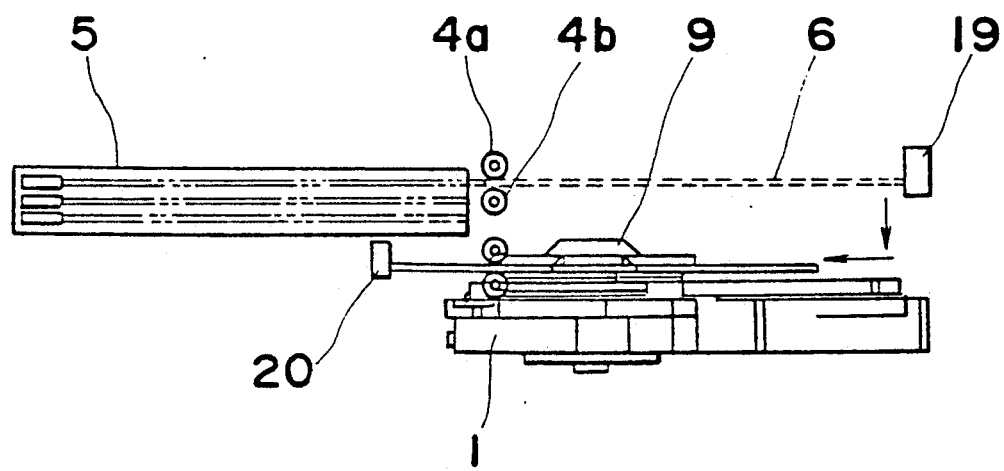
Figure 14:
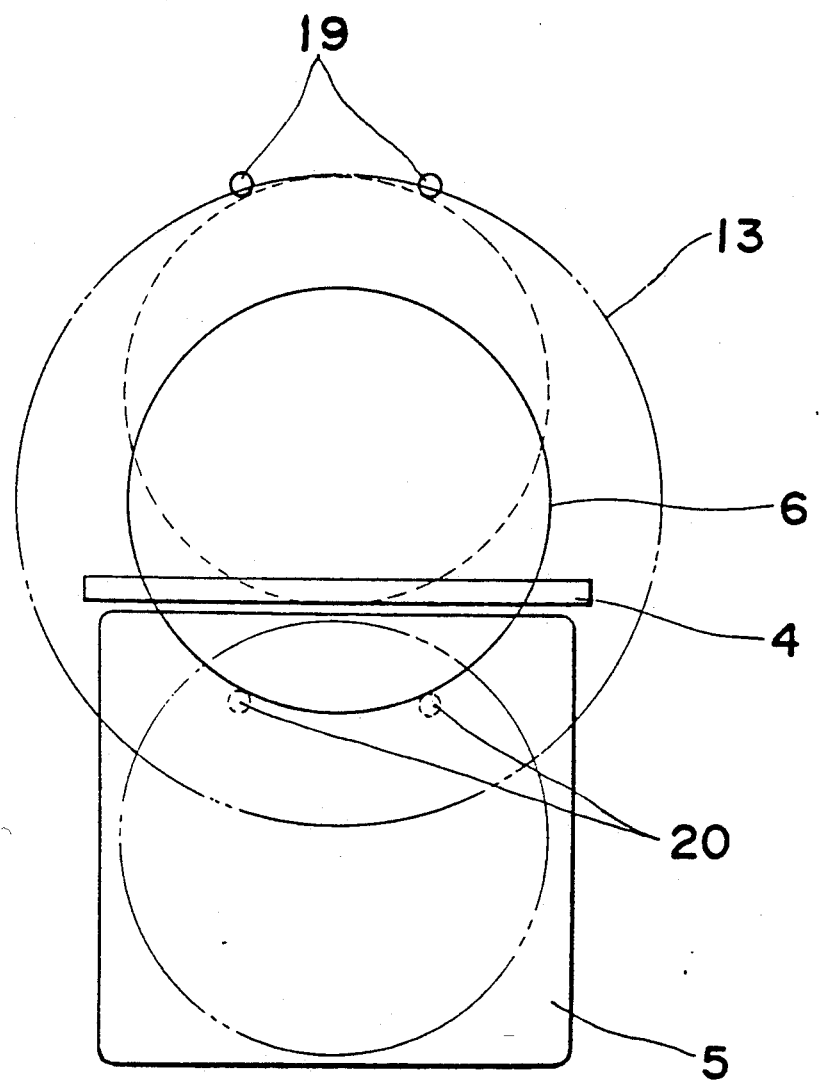

FIG. 12 through FIG. 14 show an embodiment of the present invention which saves space about the disk engagement from the magazine. FIG. 12 shows a drawout operation and the horizontal movement of the disk from the magazine. FIG. 13 shows a descent of the disk and a horizontal movement after the descent. FIG. 14 shows the positions of the CD and the CD single in the disk engagement position, and the magazine. Reference numeral 19 are upper guide pins, or a first guide, which are provided to stop, in a setting position, the horizontal movement of the CD single drawn out from the magazine 5. Reference numeral 20 are lower guide pins, or a second guide which are provided to stop the CD single in the engagement position. The lower guide pins 20 are adapted to move away so as not to come into contact against the CD single in the musical performance condition. In FIG. 12, the disk 6, which has been drawn from the magazine 5 in a method similar to that of FIG. 2, effects a horizontal movement in the direction of the arrow mark by the rotation of the rollers of the roller arm 4 to come into contact against the upper guide pins 19 so as to come to a stop. The rotation of the roller is stopped through detection by a switch, a photo-sensor or the like, or through a time setting. In FIG. 13, the disk 6 grasped by the rollers 4a and 4b of the roller arm 4 moves from the position of the broken line to the position of the solid line by the descending operation of the roller arm 4, and further effects the horizontal movement in the direction of the arrow mark by the reverse rotation of the driving roller 4b to come into contact against the lower guide pin 20 so as to come to a stop. The rotation of the driving roller 4b is also detected by the switch, the photo-sensor or the like as in the draw-out operation from the magazine 5. The solid line 6 in FIG. 14 shows the position of the disk 6 (CD single) in the musical performance condition. Also, where the CD 13 is engaged from the insertion opening, the playing position is as shown in the drawing. As compared with FIG. 2, where the plane condition of the position shown in the broken line, with the disk 6 being lowered from the height of the magazine 5, is provided as the engagement position, the space necessary for the engagement and musical performance of the CD 13 may be reduced in the present embodiment. In FIG. 14 the outer periphery of the CD 13 is adjusted to the position of the broken line of the disk 6, so that the lower space of the magazine 5 may be used more effectively.

In order to effect an initial resetting operation in the construction as described above, when the power supply has been reconnected again after an interruption of the musical performance due to a power shut off or the like, the disk 6 shown in the solid line in FIG. 13 is further moved horizontally in the arrow mark direction by the roller arm 4, and is discharged from the direct insertion opening 10 shown in FIG. 4. When the controlling operation is effected in this manner, the discriminating operation between the disk taken out from the magazine 5 and the disk inserted from the direct insertion opening 10, and the discharging operation thereof, are not necessary to be effected when the power supply has been put into work again, thus simplifying the controlling operation.

As described hereinabove, the present invention has an advantage in that the construction of the disk musical performance position is constructed diagonal with respect to the magazine accommodating position for the CD singles to allow the effective use of the space and the use of the functions of the auto-changer in the storing operation of the magazine of the CD single in the restricted space of the DIN size for car loading use.

Also, the insertion opening for loading the CD in the upper portion or the lower portion of the magazine storing position is provided to make it possible to have the change function by the magazine, to have the direct loading of the CD, and to have both the continuous playing from the magazine and playing by the direct insertion of CDs without the use of the magazine.

Also, one set of rollers may be used both for the change operation and for the direct insertion due to the vertical motion and the pivoting operation, with an advantage in that the number of components may be reduced and space may be saved as compared with a case where a roller is disposed exclusively for each respective operation.

With the disk guide member, provided forwardly in the roller feed direction, each of the CD and the CD single has its movement stopped in a given position by the disk guide member an electrical or mechanical detection is effected by the difference between the stop positions, with the advantage that it is easier to discriminate between the types of the disks.

The amount of rotation of the rollers, i.e. the amount of the feed of a disk, and the position of the guide member for positioning for the performance of a CD or CD single are selected by electrical or mechanical methods in accordance with the type of disk, i.e. or a CD or CD single.

The operative cooperation of the disk insertion preventing member with the pivoting member of the roller prevents the double insertion of a disk during an operation, such as during a disk musical performance, during a drawing-out operation of a disk from the magazine or the like.

Since a disk which has been drawn out from the magazine is discharged from the direct insertion opening during an initial resetting operation, despite that the disk was drawn out of the magazine or the disk was inserted from the direct insertion opening, the accommodation position of the original disk does not need to be electrically or mechanically stored, with the advantage that the number of components may be reduced, and that the initial resetting control may be simplified.

The musical performance position of a CD single, with respect to the accommodating position of the magazine for CD single use, may be a position where the disk is horizontally drawn out from the magazine, thereafter moved vertically, and further horizontally moved in the direction of the magazine, thus making the amount of space necessary smaller.

The traverse mechanism can be fixed at a lowered position when loading. When the engagement operation of the disk horizontally moves the disk, the traverse mechanism can be released so that the traverse mechanism is raised to effect a clamping operation of the disk, and at the same time be put into a floating condition having a degree of lateral, longitudinal freedom, thus making it possible to effect a stable musical performance free from sound skipping from car oscillations, with the further advantage that the overall operation is simplified and space saved.

Although the present invention has been fully described by way of example with reference to the accompanying drawings, it is to be noted here that various changes and modifications will be apparent to those skilled in the art. Therefore, unless otherwise such changes and modifications depart from the scope of the present invention, they should be construed as included therein.

What is claimed is:

1. a disk player, comprising:
a disk player housing;
a magazine for storing a plurality of first disks of a first diameter, positionable at a magazine mounting position in said housing;
a disk playing means for playing disks, disposed in said housing at a position deviated obliquely and rearwardly with respect to said magazine mounting position;
a disk insertion opening in said housing sized to receive a second disk of a second diameter different from said first diameter; and
a disk transfer means disposed in said housing for transferring disks between said magazine at said mounting position, said disk insertion opening and said disk playing means;
wherein said disk transfer means comprises one set of disk feed rollers that are vertically moveable between vertical positions corresponding to the first and second disks in said magazine and at said insertion opening, respectively, and a retaining member retaining said disk feed rollers, said retaining member being pivotable about a fixed point in said housing for pivoting movement between a first disk insertion opening transfer position for transferring the second disk to and from said disk insertion opening and a second transfer position for transferring disks to and from said disk playing means and to and from said magazine.

2. The disk player of claim 1, wherein:
said disk transfer means comprises one set of disk feed rollers that are vertically moveable between vertical positions corresponding to the first and second disks in said magazine and at said insertion opening, respectively, and a retaining member retaining said disk feed rollers, said retaining member being pivotable about a fixed point in said housing for pivoting movement between a first disk insertion opening transfer position for transferring the second disks to and from said disk insertion opening and a second transfer position for transferring disks to and from said disk playing means and to and from said magazine.

3. The disk player of claim 1, wherein:
said retaining member has a pivot shaft pivotably connecting said retaining member to said housing;
at said first transfer position said disk feed rollers are substantially parallel to said disk insertion opening; and
at said second transfer position said disk feed rollers extend obliquely relative to said disk insertion opening.

4. The disk player of claim 1, wherein said housing has an opening thereof for receiving said magazine therethrough for mounting said magazine at said mounting position, said opening being located above said disk insertion opening.

5. The disk player of claim 1, wherein said magazine has a plurality of disk removal levers for initiating movement of the disks from said magazine to said disk transfer means.

6. A disk player, comprising:
a disk player housing;
a magazine for storing a plurality of first disks of a first diameter, positionable at a magazine mounting position in said housing;
a disk playing means for playing disks, disposed in said housing at a position deviated obliquely and rearwardly with respect to said magazine mounting position;
a disk insertion opening in said housing sized to receive a second disk of a second diameter different from said first diameter; and
a disk transfer means disposed in said housing for transferring disks between said magazine at said mounting position, said disk insertion opening and said disk playing means;
wherein said disk transfer means is operable, when a power supply has been turned off and subsequently reconnected, to transfer and discharge a disk from said disk insertion opening which was being played by said disk playing means or which was in the process of being transferred by said disk transfer means when the power supply was turned off, regardless of whether the disk originated from said magazine or from said disk insertion opening.

7. A disk player, comprising:
a housing having a disk insertion opening therein for receipt of first and second disks of different diameters;
a disk playing means for playing disks, disposed in said housing at a position deviated obliquely and rearwardly in said housing with respect to said disk insertion opening; and
a disk transfer means disposed in said housing for transferring disks between said disk insertion opening and said disk playing means, said disk transfer means having a pair of detection guide members mounted thereon for stopping movement of both first and second disks on said transfer means upon insertion of the disks through said disk insertion opening at different stopping positions and sensing means for detecting a first or second disk at a respective said stopping position so as to determine whether a first or a second disk has been inserted into said disk insertion opening.

8. The disk player of claim 7, wherein said disk transfer means is operable to feed a disk a different amount depending on whether the disk is a first or a second disk according to the determination of said sensing means.

9. The disk player of claim 7, wherein said detection guide members have a space therebetween for allowing the first disks to advance further than the second disks before being stopped.

10. The disk player of claim 9, wherein:
said disk transfer means is pivotably mounted in said housing for pivoting movement between said disk insertion opening and said disk playing means and said magazine; and
a first said guide member is pivotably mounted on said disk transfer means so that, when said disk transfer means pivots to said disk playing means and said magazine, said first guide member pivots to allow further movement of a disk carried by said disk transfer means.

11. The disk player of claim 7, wherein said sensing means comprises at least one sensor which senses only a first disk when a disk carried by said disk transfer means is at a stopping position and at least one sensor which senses only a second disk when a disk carried by said disk transfer means is at a stopping position.

12. A disk player, comprising:
a housing;
a magazine for storing a plurality of first disks mountable at a mounting position in said housing;
a disk playing means for playing disks disposed at a position in said housing deviated obliquely and rearwardly of said mounting position of said magazine;
a disk insertion opening in said housing sized to receive second disks, the second disks having a diameter different from the first disks;
a disk transfer means disposed in said housing for transfer of disks between said magazine when said magazine is mounted at said mounting position, said disk insertion opening and said disk playing means; and
prevention means for preventing a disk from being inserted into said disk insertion opening when a disk is being played by said disk playing means or when a first disk is being transferred by said disk transfer means from said magazine.

13. The disk player of claim 12, wherein said prevention means comprises a vertically moveable member disposed at said disk insertion opening moveable to uncover said disk insertion opening in response to the presence of said disk transfer means.

14. A disk player, comprising:
a housing;
a magazine for storing a plurality of disks therein mountable at a mounting position in said housing:
a disk playing means disposed in said housing for playing disks from said magazine, said disk playing means being positioned below the level of said magazine in said housing and having a playing position for the disks different than the position of said magazine; and
a disk transfer means disposed between said mounting position of said magazine and said disk playing means for transferring disks between said magazine when said magazine is in said mounting position and said disk playing means by horizontal movement of disks to and from said magazine, vertical movement and horizontal movement to and from said playing position, said disk transfer means comprising a first guide for regulating the position of a disk when the disk is horizontally moved from said magazine and a second guide disposed below said mounting position of said magazine for regulating the position of a disk when the disk is horizontally moved to said playing position, whereby a disk is horizontally moved from said magazine, vertically moved toward said disk playing means and horizontally moved to said playing position.

15. The disk player of claim 14, wherein a disk extends at least partly below said magazine in said playing position.

16. The disk player of one of claims 1, 7, 12 or 14, wherein:
said disk playing means comprise a traverse mechanism body spring mounted in said housing so as to upwardly bias said disk playing means when a disk is played by said disk playing means; and
said disk playing means is downwardly fixedly secured when a disk is transferred by said disk transfer means.

* * * * *